(12) United States Patent
Morita et al.

(10) Patent No.: US 10,864,825 B2
(45) Date of Patent: Dec. 15, 2020

(54) WEAR DEGREE INFORMATION ACQUIRING DEVICE, WEAR DEGREE INFORMATION ACQUIRING METHOD, VEHICLE AND PROGRAM

(71) Applicant: Mitsubishi Heavy Industries Engineering, Ltd., Kanagawa (JP)

(72) Inventors: Katsuaki Morita, Tokyo (JP); Kazuki Ozaki, Tokyo (JP); Hisashi Motoyama, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 189 days.

(21) Appl. No.: 16/078,027

(22) PCT Filed: Feb. 8, 2017

(86) PCT No.: PCT/JP2017/004526
§ 371 (c)(1),
(2) Date: Aug. 21, 2018

(87) PCT Pub. No.: WO2017/145754
PCT Pub. Date: Aug. 31, 2017

(65) Prior Publication Data
US 2019/0047440 A1 Feb. 14, 2019

(30) Foreign Application Priority Data
Feb. 22, 2016 (JP) .................................. 2016-031397

(51) Int. Cl.
*B60M 1/28* (2006.01)
*G01B 11/30* (2006.01)
(Continued)

(52) U.S. Cl.
CPC ............... *B60M 1/28* (2013.01); *G01B 11/30* (2013.01); *G01C 3/22* (2013.01); *G01B 11/245* (2013.01)

(58) Field of Classification Search
CPC ............ B60M 1/28; G01B 11/30; G01C 3/22
See application file for complete search history.

(56) References Cited

U.S. PATENT DOCUMENTS

2009/0079997 A1* 3/2009 Watabe .................... B60M 1/28
356/636
2009/0320554 A1* 12/2009 Watabe .................... B60M 1/28
73/7

FOREIGN PATENT DOCUMENTS

EP 1855084 A2 11/2007
EP 3051252 A1 8/2016
(Continued)

OTHER PUBLICATIONS

Tsunemoto et al., Japanese patent application Publication JP 2015-184174A (translation) (Year: 2015).*
(Continued)

*Primary Examiner* — Hussein Elchanti
(74) *Attorney, Agent, or Firm* — Kanesaka Berner and Partners, LLP

(57) ABSTRACT

A wear degree information acquiring device includes a power cable measuring unit which measures a distance from a predetermined position of a vehicle to a wearing part coming into contact with the vehicle among power cables configured to supply power to the vehicle, and a distance from the predetermined position of the vehicle to a non-wearing part not coming into contact with the vehicle among the power cables; and a wear degree information acquiring unit which acquires information indicating a degree of wear of the power cable, on the basis of a difference between the distance from the predetermined position of the vehicle to (Continued)

the wearing part and the distance from the predetermined position of the vehicle to the non-wearing part.

6 Claims, 8 Drawing Sheets

(51) Int. Cl.
*G01C 3/22* (2006.01)
*G01B 11/245* (2006.01)

(56) References Cited

FOREIGN PATENT DOCUMENTS

| JP | 05278503 A | 10/1993 |
|---|---|---|
| JP | 2003011702 A | 1/2003 |
| JP | 2006258531 A | 9/2006 |
| JP | 4635657 B2 | 2/2011 |
| JP | 2015068675 A | 4/2015 |
| JP | 2015184174 A | 10/2015 |

OTHER PUBLICATIONS

International Search Report and Written Opinion for International Application No. PCT/JP2017/004526 dated May 9, 2017; 14pp.

* cited by examiner

WEAR DEGREE INFORMATION ACQUIRING DEVICE, WEAR DEGREE INFORMATION ACQUIRING METHOD, VEHICLE AND PROGRAM

RELATED APPLICATIONS

The present application is a National Phase of International Application Number PCT/JP2017/004526 filed Feb. 8, 2017 and claims priority from Japanese Application Number 2016-031397 filed Feb. 22, 2016.

TECHNICAL FIELD

The present invention relates to a wear degree information acquiring device, a wear degree information acquiring method, a vehicle, and a program.

Priority is claimed on Japanese Patent Application No. 2016-031397, filed Feb. 22, 2016, the content of which is incorporated herein by reference.

BACKGROUND ART

In a case where a vehicle runs by receiving supply of power from a power cable, such as in an electric railway or a new transportation system, it is necessary to detect wear of the power cable and replace the power cable. Several techniques for detecting wear of a power cable have been proposed.

For example, a trolley wire wear measuring device described in Patent Literature 1 detects an edge of a wearing part of a trolley wire from a line sensor image obtained using a line sensor, and obtains a width of the wearing part of the trolley wire on the basis of the detected edge. Further, Patent Literature 1 discloses, as a method of measuring wear of a trolley wire, a method of converting the width of a wearing part of a trolley wire into a thickness of the trolley wire.

CITATION LIST

Patent Literature

[Patent Literature 1] Japanese Patent No. 4635657

SUMMARY OF INVENTION

Technical Problem

Depending on the shape of a power cable, there is a case where the width of a wearing part remains substantially constant even if the power cable is worn. In this case, as a method of detecting wear of a power cable, it is not possible to use the method of obtaining the width of the wearing part of the power cable.

The present invention provides a wear degree information acquiring device, a wear degree information acquiring method, a vehicle, and a program capable of detecting wear of a power cable, even when the width of a wearing part remains substantially constant when the power cable is worn.

Solution to Problem

According to a first aspect of the present invention, a wear degree information acquiring device includes a power cable measuring unit which measures a distance from a predetermined position in a vehicle to a wearing part coming into contact with the vehicle in power cables configured to supply power to the vehicle, and a distance from the predetermined position in the vehicle to a non-wearing part not coming into contact with the vehicle in the power cables; and a wear degree information acquiring unit which acquires information indicating a degree of wear of the power cable, on the basis of a difference between the distance from the predetermined position in the vehicle to the wearing part and the distance from the predetermined position in the vehicle to the non-wearing part.

The wear degree information acquiring device may further include a timing detection unit which outputs a sampling timing signal at respective times when the vehicle is running over regular time intervals, and the wear degree information acquiring unit may acquire information indicating the degree of wear of the power cable, each time the timing detection unit outputs the sampling timing signal.

The power cable measuring unit may scan a plurality of positions on the wearing part obliquely with respect to a running direction of the vehicle to measure a distance from the predetermined position of the vehicle to each of the plurality of scanned positions, and the wear degree information acquiring unit may acquire information indicating the degree of wear at each scanned position by the power cable measuring unit in the wearing part.

According to a second aspect of the present invention, the vehicle includes any one of the above-described wear degree information acquiring devices.

According to a third aspect of the present invention, a method of acquiring wear degree information includes: measuring a distance from a predetermined position of a vehicle to a wearing part coming into contact with the vehicle among power cables configured to supply power to the vehicle, and a distance from the predetermined position of the vehicle to a non-wearing part not coming into contact with the vehicle among the power cables; and acquiring information indicating a degree of wear of the power cable, on the basis of a difference between the distance from the predetermined position of the vehicle to the wearing part and the distance from the predetermined position of the vehicle to the non-wearing part.

According to a fourth aspect of the present invention, a program causes a computer to measure a distance from a predetermined position of a vehicle to a wearing part coming into contact with the vehicle among power cables configured to supply power to the vehicle, and a distance from the predetermined position of the vehicle to a non-wearing part not coming into contact with the vehicle among the power cables; and causes the computer to acquire information indicating a degree of wear of the power cable, on the basis of a difference between the distance from the predetermined position of the vehicle to the wearing part and the distance from the predetermined position of the vehicle to the non-wearing part.

Advantageous Effects of Invention

According to the wear degree information acquiring device, the wear degree information acquiring method, the vehicle and the program, wear of the power cable can be detected, even when the width of the wearing part remains substantially constant, when the power cable is worn.

EMBODIMENTS FOR CARRYING OUT THE INVENTION

Hereinafter, embodiments of the present invention will be described, but the following embodiments do not limit the invention according to the claims. In addition, all combinations of the features described in the embodiments are not necessarily essential to the solution means of the invention.

Figure 1:
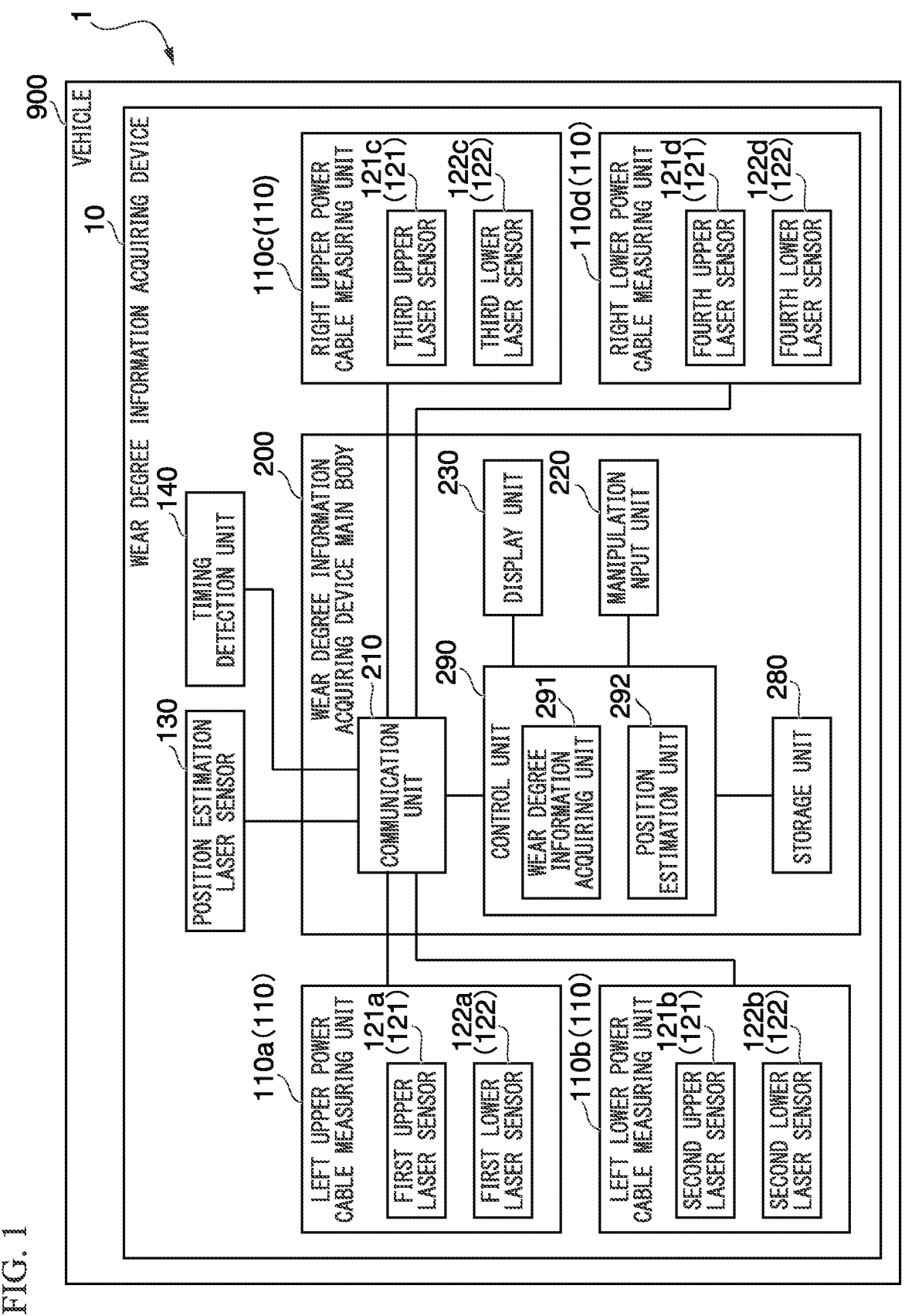
FIG. 1 is a schematic block diagram illustrating a functional configuration of a wear degree information acquiring device according to an embodiment of the present invention.

FIG. 1 is a schematic block diagram illustrating a functional configuration of a wear degree information acquiring device according to an embodiment of the present invention. As illustrated in FIG. 1, the wear degree information acquiring device 10 includes a left upper power cable measuring unit 110a, a left lower power cable measuring unit 110b, a right upper power cable measuring unit 110c, a right lower power cable measuring unit 110d, a position estimation laser sensor 130, a timing detection unit 140, and a wear degree information acquiring device main body 200.

The left upper power cable measuring unit 110a includes a first upper laser sensor 121a and a first lower laser sensor 122a. The left lower power cable measuring unit 110b includes a second upper laser sensor 121b and a second lower laser sensor 122b. The right upper power cable measuring unit 110c includes a third upper laser sensor 121c and a third lower laser sensor 122c. The right lower power cable measuring unit 110d includes a fourth upper laser sensor 121d and a fourth lower laser sensor 122d.

The wear degree information acquiring device main body 200 includes a communication unit 210, a manipulation input unit 220, a display unit 230, a storage unit 280, and a control unit 290. The control unit 290 includes a wear degree information acquiring unit 291 and a position estimation unit 292.

The wear degree information acquiring device 10 is provided in a vehicle 900.

Hereinafter, the left upper power cable measuring unit 110a, the left lower power cable measuring unit 110b, the right upper power cable measuring unit 110c, and the right lower power cable measuring unit 110d are collectively referred to as a power cable measuring unit 110. Further, the first upper laser sensor 121a, the second upper laser sensor 121b, the third upper laser sensor 121c, and the fourth upper laser sensor 121d are collectively referred to as an upper laser sensor 121. The first lower laser sensor 122a, the second lower laser sensor 122b, the third lower laser sensor 122c, and the fourth lower laser sensor 122d are collectively referred to as a lower laser sensor 122.

The wear degree information acquiring device 10 detects the degree of wear of the power cable that supplies electric power to the vehicle 900.

Figure 2:
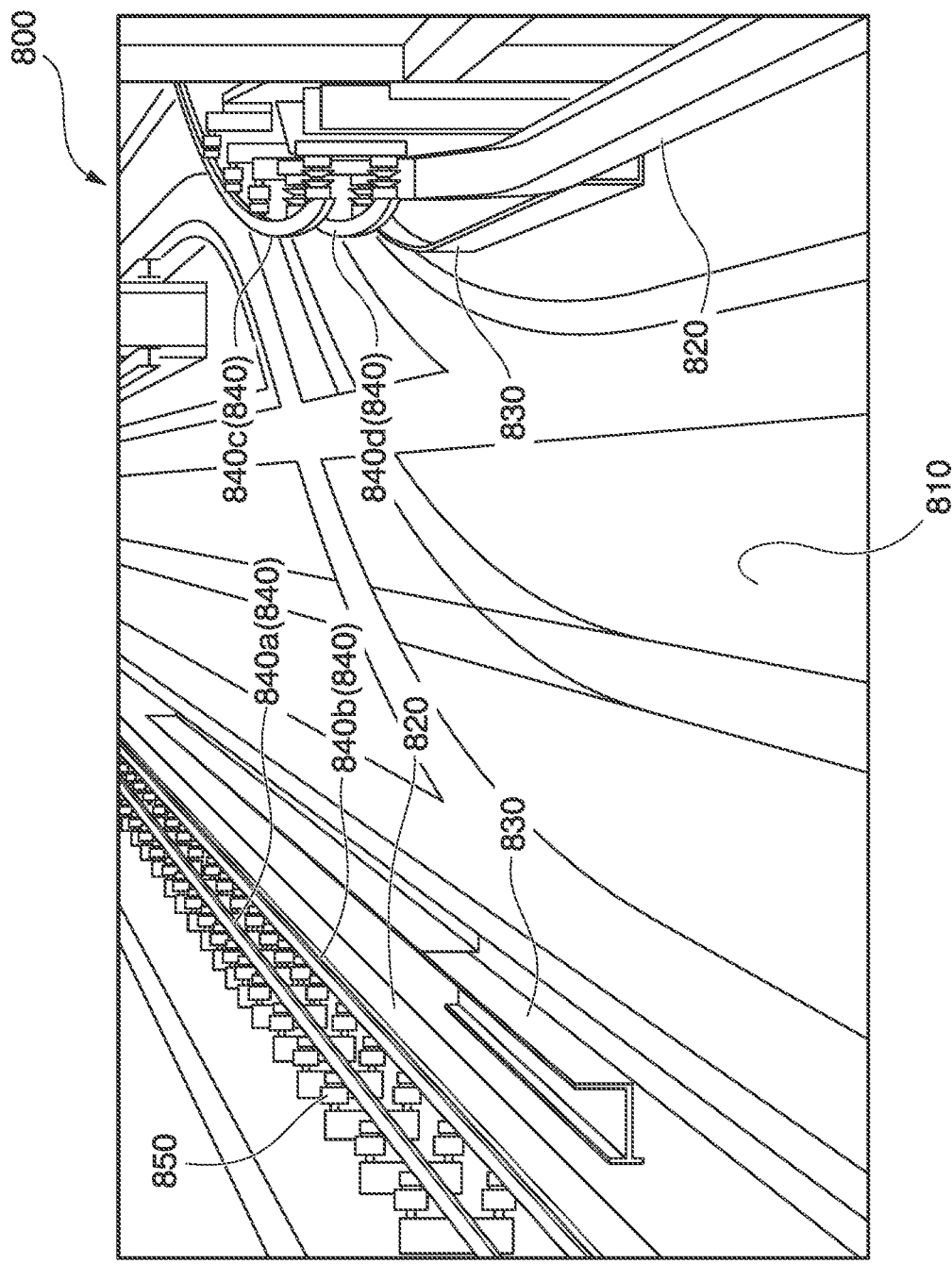
FIG. 2 is an explanatory view illustrating an arrangement example of a power cable according to the embodiment of the present invention.

FIG. 2 is an explanatory view illustrating an arrangement example of a power cable. FIG. 2 illustrates a schematic configuration of a trajectory on which the vehicle 900 runs.

As illustrated in FIG. 2, a trajectory 800 includes a road surface 810, a guide rail 820, a branching rail 830, a left upper power cable 840a, a left lower power cable 840b, a right upper power cable 840c, a right lower power cable 840d, and an insulator 850.

Hereinafter, the left upper power cable 840a, the left lower power cable 840b, the right upper power cable 840c, and the right lower power cable 840d are collectively referred to as a power cable 840.

The trajectory 800 constitutes a running route of the vehicle 900.

The road surface 810 is a surface on which the vehicle 900 runs. The road surface 810 is formed, for example, approximately horizontally on the surface of concrete.

The guide rail 820 restricts the direction of the vehicle 900 so that the vehicle 900 runs on the road surface 810. The guide rail 820 is provided on both sides of the trajectory 800. Both sides of the trajectory 800 are on both sides of the road surface 810, respectively. The vehicle 900 runs while bringing the guide wheels into contact with the guide rails 820. Therefore, the direction of the vehicle 900 is restricted such that it does not to deviate from the top of the road surface 810.

The branching rail 830 is provided at a branching point of the trajectory 800 and guides the vehicle 900 running at the branching point to one of branch destinations. The branching rail 830 has a movable part and switches the direction of the movable part depending on the route that the vehicle 900 needs to run. The vehicle 900 places branching wheels on either one of the right and left branching rails 830 depending on the direction of the movable part of the branching rail 830. When the branching wheel moves along the branching rail 830, the vehicle 900 runs by being guided to a branch destination.

The power cable 840 transmits the power which is output by the power supply equipment of the new transportation system and supplies the power to the vehicle 900.

The left upper power cable 840a is a positive electrode and the left lower power cable 840b is a negative electrode, and DC power is supplied to the vehicle 900 by a combination of the left upper power cable 840a and the left lower power cable 840b.

Further, in the branching portion of the trajectory 800, power cables 840 are provided on both right and left sides of the trajectory 800 so that power supply is not interrupted irrespective of the branch destination to which the vehicle 900 moves. In the example of FIG. 2, in addition to the left upper power cable 840a and the left lower power cable 840b on the left side in the running direction of the vehicle 900, a right upper power cable 840c and a right lower power cable 840d are provided on the right side in the running direction. The right upper power cable 840c is a positive electrode and the right lower power cable 840d is a negative electrode, and DC power is supplied to the vehicle 900 by a combination of the right upper power cable 840c and the right lower power cable 840d.

Each of the power cables 840 is installed using an insulator 850.

The number of power cables 840 which are targets for wear detection by the wear degree information acquiring device 10 may be one or more. The power cable 840 in which the wear degree information acquiring device 10 is the wearing detection target may be a power cable that supplies AC power.

The power cable measuring unit 110 measures a distance from the predetermined position of the vehicle 900 with respect to the wearing part being in contact with the vehicle 900 and the non-wearing part not being in contact with the vehicle 900 among the power cables 840 that supply power to the vehicle 900.

The upper laser sensor 121 measures the distance between the upper laser sensor 121 itself and the power cable 840, by irradiating the power cable 840 with a laser (laser beam) from an oblique upper part of the power cable 840. The position at which the upper laser sensor 121 is installed corresponds to an example of a predetermined position of the vehicle 900.

The upper laser sensor 121 changes the irradiation direction of the laser upward and downward to apply the laser to both the wearing part and the non-wearing part of the power cable 840. As a result, the upper laser sensor 121 measures both the distance between the upper laser sensor 121 itself and the wearing part, and the distance between the upper laser sensor 121 itself and the non-wearing part.

The lower laser sensor 122 measures the distance between the lower laser sensor 122 itself and the power cable 840, by irradiating the power cable 840 with the laser from the oblique lower part of the power cable 840. The position at which the lower laser sensor 122 is installed corresponds to an example of a predetermined position of the vehicle 900.

The lower laser sensor 122 changes the irradiation direction of the laser upward and downward to apply the laser to both the wearing part and the non-wearing part of the power cable 840. As a result, the lower laser sensor 122 measures both the distance between the lower laser sensor 122 itself and the wearing part, and the distance between the lower laser sensor 122 itself and the non-wearing part.

Figure 3:
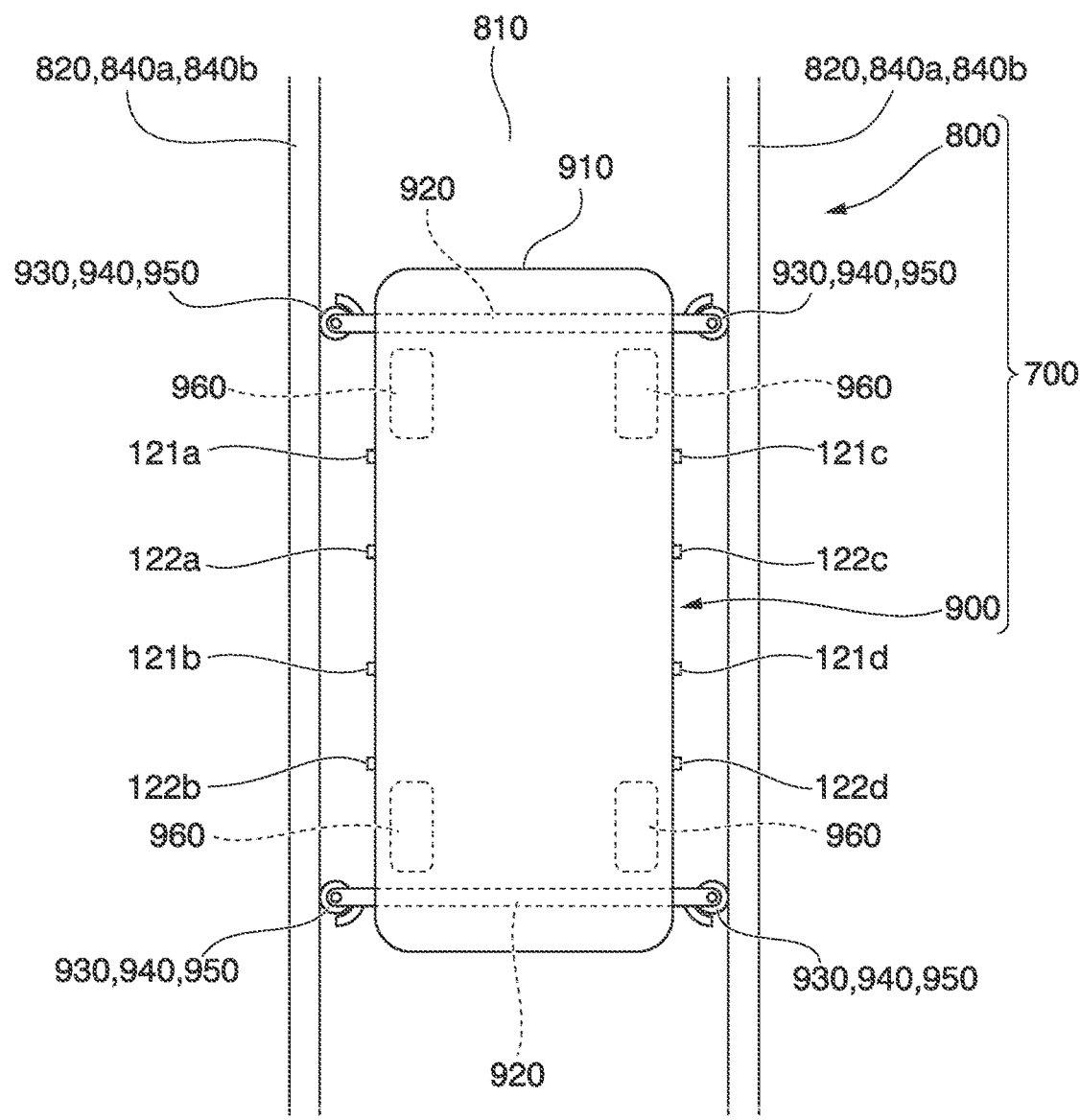
FIG. 3 is an explanatory view illustrating an arrangement example of an upper laser sensor and a lower laser sensor according to the embodiment of the present invention.

FIG. 3 is an explanatory view illustrating an arrangement example of the upper laser sensor 121 and the lower laser sensor 122. FIG. 3 illustrates a state in which the vehicle 900 is seen from above the vehicle 900.

As illustrated in FIG. 3, the new transportation system 700 includes the trajectory 800 and a vehicle 900. As described with reference to FIG. 2, the trajectory 800 includes a road surface 810, a guide rail 820, a left upper power cable 840a, a left lower power cable 840b, a right upper power cable 840c, and a right lower power cable 840d. The vehicle 900 includes a vehicle main body 910, a support 920, a guide wheel 930, a branching wheel 940, a current collector 950, and a running tire 960. As described with reference to FIG. 1, the vehicle 900 further includes a first upper laser sensor 121a, a second upper laser sensor 121b, a third upper laser sensor 121c, a fourth upper laser sensor 121d, a first lower laser sensor 122a, a second lower laser sensor 122b, a third lower laser sensor 122c, and a fourth lower laser sensor 122d.

The vehicle 900 runs on a running route formed by the trajectory 800. The vehicle 900, for example, transports passengers or cargo.

The vehicle main body 910 accommodates objects to be conveyed such as passengers or cargo. A running tire 960 is provided on a lower portion of the vehicle main body 910. A support 920 is provided to protrude laterally from the vehicle main body 910. Further, as illustrated in FIG. 3, the vehicle main body 910 is provided with a first upper laser sensor 121a, a second upper laser sensor 121b, a third upper laser sensor 121c, a fourth upper laser sensor 121d, a first lower laser sensor 122a, a second lower laser sensor 122b, a third lower laser sensor 122c, and a fourth lower laser sensor 122d.

The support 920 supports the guide wheel 930, the branching wheel 940 and the current collector 950. Specifically, the guide wheel 930, the branching wheel 940 and the current collector 950 are provided at each of the right and left end portions of the support 920. The support 920 maintains an approximately fixed interval between the guide wheel 930, the branching wheel 940 and the current collector 950 and the vehicle main body 910.

The guide wheel 930 restricts the direction of the vehicle 900 so that the vehicle 900 runs on the road surface 810 by hitting the guide rail 820 when the vehicle 900 runs.

The branching wheel 940 moves along the branching rail 830 at the branching point of the trajectory 800 to guide the vehicle 900 to one of the trajectories 800 of the branching destinations.

The current collector 950 comes into contact with the power cable 840 to receive the electric power from the power cable 840.

The running tire 960 is provided on a lower side (a side close to the road surface 810) of the vehicle main body 910 and comes into contact with the road surface 810. As the running tire 960 rotates, the vehicle 900 runs. The vehicle 900 moves due to this running.

Figure 4:
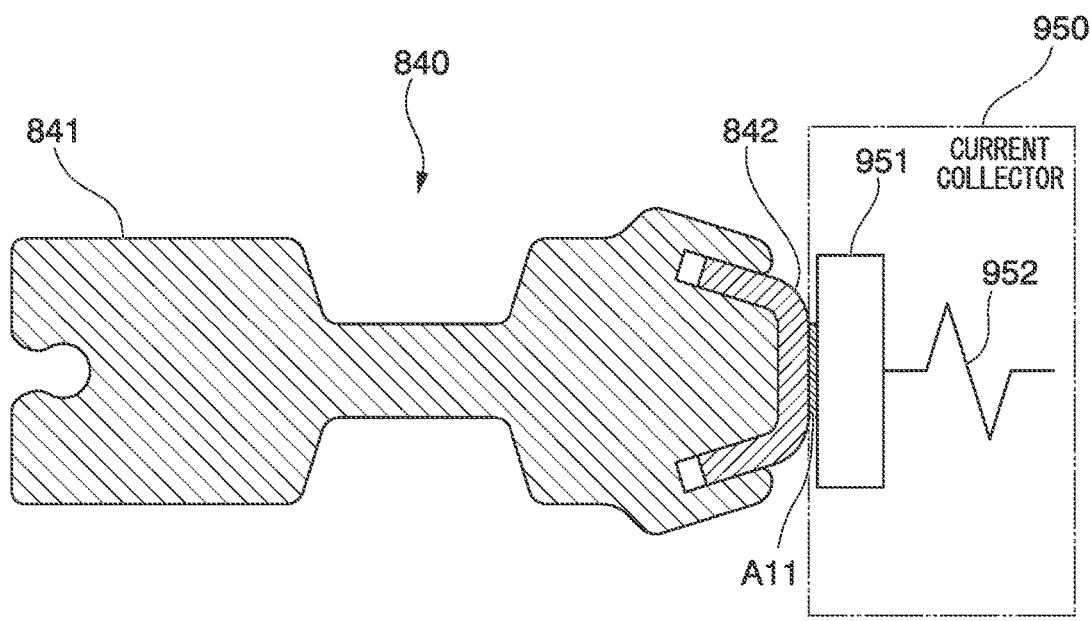
FIG. 4 is an explanatory view illustrating an example of a positional relationship between a contact part and a non-contact part of the power cable according to the embodiment of the present invention.

FIG. 4 is an explanatory view illustrating an example of the positional relationship between a contact part and a non-contact part of the power cable 840. FIG. 4 illustrates a schematic shape of each part in a cross section of the power cable 840.

As illustrated in FIG. 4, the power cable 840 includes a power cable main body 841 and a contact member 842. The current collector 950 includes a rubbing plate 951 and a spring 952.

The power cable main body 841 is made of aluminum, has high conductivity and is relatively soft.

If the entire power cable 840 is made of aluminum, since wear of the power cable 840 becomes severe, it becomes necessary to replace the power cable 840 immediately. Therefore, the contact member 842 is provided at a portion in which the power cable 840 comes into contact with the rubbing plate 951. The contact member 842 is made of stainless steel, is harder than the aluminum power cable main body 841, and hardly wears.

The power cable main body 841 corresponds to an example of a non-contact part. A portion of the contact member 842 which comes into contact with the rubbing plate 951 corresponds to an example of the contact part. In FIG. 4, a region A11 corresponds to an example of a contact part.

The rubbing plate 951 comes into contact with the power cable 840 to receive the electric power from the power cable 840. The rubbing plate 951 is made of, for example, a carbon-based conductive material.

The spring 952 presses the rubbing plate 951 against the power cable 840.

Figure 5:
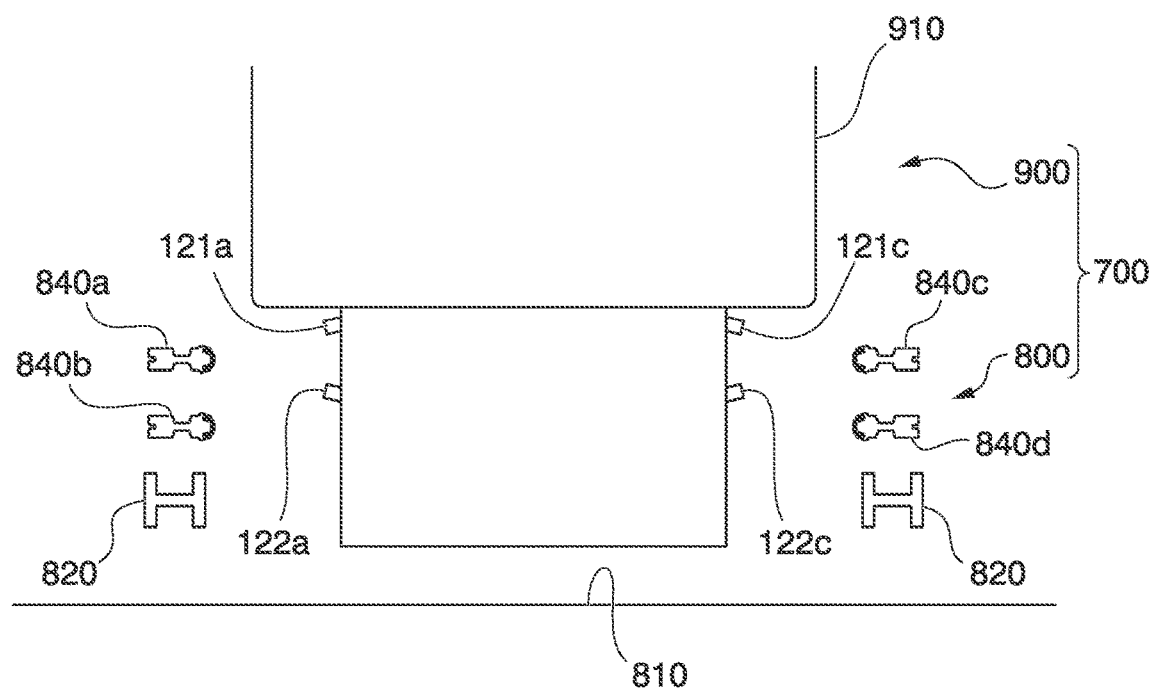
FIG. 5 is an explanatory view illustrating an example of a vertical direction of the upper laser sensor and the lower laser sensor according to the embodiment of the present invention.

FIG. 5 is an explanatory view illustrating an example of the vertical direction of the upper laser sensor 121 and the lower laser sensor 122.

FIG. 5 illustrates an aspect as seen from the rear side of the vehicle 900 toward the running direction of the vehicle 900. The first upper laser sensor 121a, the third upper laser sensor 121c, the first lower laser sensor 122a and the third lower laser sensor 122c among the upper laser sensor 121 and the lower laser sensor 122 are illustrated.

The first upper laser sensor 121a is installed on the obliquely upper part of the left upper power cable 840a toward the left upper power cable 840a. As a result, the first upper laser sensor 121a measures the distance between the first upper laser sensor 121a itself and the left upper power cable 840a by irradiating the left upper power cable 840a with the laser.

The first lower laser sensor 122a is installed on the obliquely lower part of the left upper power cable 840a toward the left upper power cable 840a. Therefore, the first lower laser sensor 122a measures the distance between the first lower laser sensor 122a itself and the left upper power cable 840a by irradiating the left upper power cable 840a with the laser.

The third upper laser sensor 121c is installed on the obliquely upper part of the right upper power cable 840c toward the right upper power cable 840c. As a result, the third upper laser sensor 121c measures the distance between the third upper laser sensor 121c itself and the right upper power cable 840c by irradiating the right upper power cable 840c with the laser.

The third lower laser sensor 122c is installed on the obliquely lower part of the right upper power cable 840c toward the right upper power cable 840c. As a result, the third lower laser sensor 122c measures the distance between the third lower laser sensor 122c itself and the right upper power cable 840c by irradiating the right upper power cable 840c with the laser.

Similarly, the second upper laser sensor 121b is installed on the obliquely upper part of the left lower power cable 840b toward the left lower power cable 840b. As a result, the second upper laser sensor 121b measures the distance between the second upper laser sensor 121b itself and the left lower power cable 840b by irradiating the left lower power cable 840b with the laser.

The second lower laser sensor 122b is installed on the obliquely lower part of the left lower power cable 840b toward the left lower power cable 840b. As a result, the second lower laser sensor 122b measures the distance between the second lower laser sensor 122b itself and the left lower power cable 840b by irradiating the left lower power cable 840b with the laser.

The fourth upper laser sensor 121d is installed on the obliquely upper part of the right lower power cable 840d toward the right lower power cable 840d. Therefore, the fourth upper laser sensor 121d measures the distance between the fourth upper laser sensor 121d itself and the right lower power cable 840d by irradiating the right lower power cable 840d with the laser.

The fourth lower laser sensor 122d is installed on the obliquely lower part of the right lower power cable 840d toward the right lower power cable 840d. Therefore, the fourth lower laser sensor 122d measures the distance between the fourth lower laser sensor 122d itself and the right lower power cable 840d by irradiating the right lower power cable 840d with the laser.

As in the example of FIG. 3, the first upper laser sensor 121a and the first lower laser sensor 122a are disposed at positions shifted in a longitudinal direction of the vehicle 900. Therefore, the first upper laser sensor 121a and the first lower laser sensor 122a are disposed at positions shifted in the running direction of the vehicle 900. Thus, it is possible to avoid a problem in which the laser which is output from the first upper laser sensor 121a and the laser which is output from the first lower laser sensor 122a interfere with each other to deteriorate the measurement accuracy of the distance.

A combination of the second upper laser sensor 121b and the second lower laser sensor 122b, a combination of the third upper laser sensor 121c and the third lower laser sensor 122c, and a combination of the fourth upper laser sensor 121d and the fourth lower laser sensor 122d are also the same as the case of the combination of the first upper laser sensor 121a and the first lower laser sensor 122a.

Figure 6:
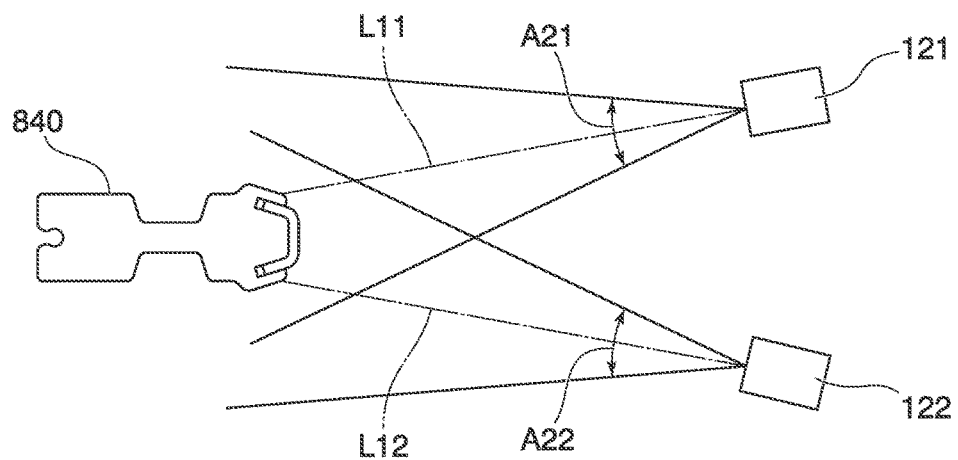
FIG. 6 is an explanatory view illustrating an example of a laser irradiation range of the upper laser sensor and the lower laser sensor according to the embodiment of the present invention.

FIG. 6 is an explanatory view illustrating an example of a laser irradiation range of the upper laser sensor 121 and the lower laser sensor 122. As described with reference to FIG. 5, the upper laser sensor 121 is located on the obliquely upper part of the power cable 840 and radiates the laser toward the power cable 840. The lower laser sensor 122 is located on the obliquely lower part of the power cable 840 and radiates the laser toward the power cable 840.

The upper laser sensor 121 changes the direction of the laser upward and downward within the range of an angle A21. As a result, the upper laser sensor 121 scans at least part of the wearing part of the power cable 840 and part of the non-wearing part, and measures the distance between the upper laser sensor 121 itself and the scanned part. In FIG. 4, the wearing part of the power cable 840 is indicated by a region A11. The portion of the power cable main body 841 of the power cable 840 corresponds to an example of the non-wearing part. A line L11 indicates the center of the range in which the upper laser sensor 121 changes the direction of the laser. In FIG. 6, the center of the range in which the upper laser sensor 121 changes the direction of the laser is the center of an angle A21.

The lower laser sensor 122 changes the direction of the laser upward and downward within the range of an angle A22. As a result, the lower laser sensor 122 scans at least part of the wearing part of the power cable 840 and part of the non-wearing part, and measures the distance between the lower laser sensor 122 itself and the scanned part. A line L12 indicates the center of the range in which the lower laser sensor 122 changes the direction of the laser. In FIG. 6, the center of the range in which the lower laser sensor 122 changes the direction of the laser is the center of the angle A22.

In this manner, the upper laser sensor 121 and the lower laser sensor 122 scan the power cable 840, respectively. Therefore, even if a dead angle occurs in the wearing part with respect to either one of the upper laser sensor 121 and the lower laser sensor 122, it is possible to scan the entire wearing part by a combination of the upper laser sensor 121 and the lower laser sensor 122. It is possible to increase the likelihood that the wear degree information acquiring unit 291 can detect wear of the power cable 840, by scanning the entire wearing part using the upper laser sensor 121 and the lower laser sensor 122.

However, the power cable measuring unit 110 may include only one of the upper laser sensor 121 and the lower laser sensor 122. Therefore, the structure of the power cable measuring unit 110 can be simplified. Alternatively, the power cable measuring unit 110 may include three or more laser sensors.

In a case where the power cable measuring unit 110 includes a plurality of laser sensors such as including the upper laser sensor 121 and the lower laser sensor 122, the wear degree information acquiring device 10 may manage the data for each laser sensor, and may synthesize data of the plurality of laser sensors into one. For example, a diagram illustrating the shape of the power cable 840 described later with reference to FIG. 10 may be made a single figure by combining a plurality of laser sensors with the wear degree information acquiring unit 291. When synthesizing data of a plurality of laser sensors into one, it is necessary to pay attention that the installation position in the running direction of the vehicle 900 is different for each laser sensor as described with reference to FIG. 2. For example, the wear degree information acquiring unit 291 synthesizes data at different timings by converting the difference in installation position in the running direction of the vehicle 900 into time.

The position estimation laser sensor 130 measures the distance between the position estimation laser sensor 130 and a surrounding object for position estimation of the vehicle 900. Specifically, the position estimation laser sensor 130 repeats measurement of the distance, while changing the direction of the laser to be irradiated in the horizontal direction. The horizontal direction here is right and left.

Figure 7:
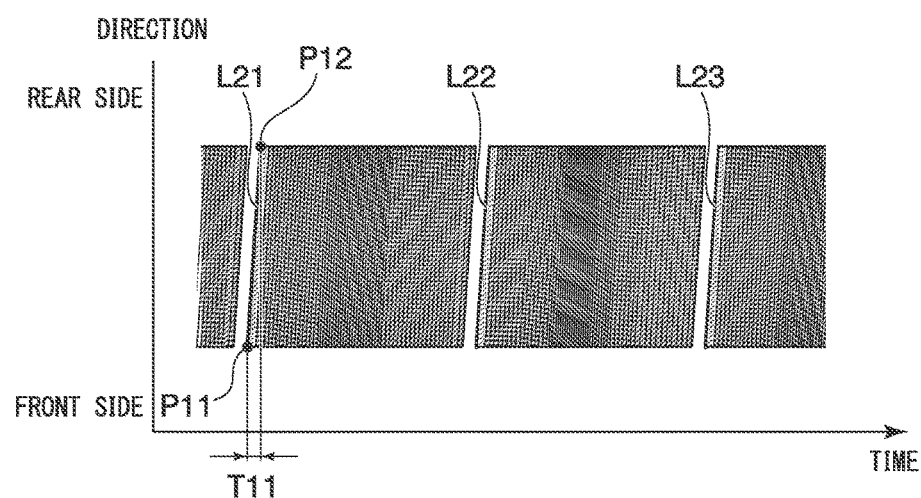
FIG. 7 is a graph illustrating an example of distance measured by a position estimation laser sensor according to the embodiment of the present invention.

FIG. 7 is a graph illustrating an example of distances measured by the position estimation laser sensor 130. In the graph of FIG. 7, a horizontal axis represents time and a vertical axis represents the direction of the laser irradiated by the position estimation laser sensor 130. The lower side of the vertical axis indicates that the direction of the laser is close to in front of the vehicle 900, and the upper side of the vertical axis indicates that the direction of the laser is close to the rear of the vehicle 900. In front of the vehicle 900 referred to here is the running direction of the vehicle 900. To the rear of the vehicle 900 referred to here is toward the side opposite to the running direction of the vehicle 900.

The distance between the position estimation laser sensor 130 and the object irradiated with the laser is illustrated in grayscale. Both the lines L21, L22, and L23 are darker than the other portions, and indicate that the laser hits the object relatively close to the position estimation laser sensor 130.

The position estimation laser sensor 130 measures the distance, while changing the direction of the laser by a predetermined angle at a constant angular velocity from the side in front of the vehicle 900 to side to the rear of the vehicle 900 in a direction transverse to the running direction of the vehicle 900. The lateral direction referred to here is the horizontal direction. When reaching the predetermined angle, the position estimation laser sensor 130 returns the direction of the laser to its original direction, without measuring the distance. Here, the original direction is the direction at the time of the start of distance measurement. After the direction of the laser returns to the original direction, the position estimation laser sensor 130 measures the distance again, while changing the direction of the laser by a predetermined angle at a constant angular velocity from the front side of the vehicle 900 to the rear side of the vehicle 900. In this manner, the position estimation laser sensor 130 repeats the distance measurement, while changing the direction of the laser from the front side of the vehicle 900 to the rear side of the vehicle 900.

When the position estimation laser sensor 130 swings the laser at a sufficiently high speed with respect to the running speed of the vehicle 900, the distance to the same object as the position estimation laser sensor 130 is repeatedly measured. When swinging the laser as referred to here, the direction of the laser is changed. As a result, as illustrated in the example of FIG. 7, a line appears in the graph indicating the distance measured by the position estimation laser sensor 130. In particular, in the portions of the lines L21, L22, and L23, all of them are dark lines due to the laser striking on the object relatively close to the position estimation laser sensor 130.

More specifically, the position estimation laser sensor 130 radiates the laser with a height at which the laser hits the insulator 850 in FIG. 2. At the timing when the laser hits the insulator 850, the distance between the position estimation laser sensor 130 and the object hit by the laser is closer than at the other timing. Since a plurality of insulators 850 are installed on the side of the trajectory 800, a plurality of dark lines such as the lines L21, L22, and L23 are generated.

However, the height at which the position estimation laser sensor 130 radiates the laser is not limited to the height hitting the insulator 850, and may be any height as long as there is a different distance from the position estimation laser sensor 130 at the position where the laser hits.

Here, when the vehicle 900 stops, the same object is irradiated with the laser at the timing when the direction of laser becomes the same direction in each scanning Therefore, as illustrated in the graph of FIG. 7, when the time is taken on the horizontal axis and the direction of the laser is taken on the vertical axis, a line parallel to the horizontal axis appears.

On the other hand, when the vehicle 900 runs, the relative position of the laser irradiation target with respect to the position estimation laser sensor 130 moves to the rear side of the vehicle 900 with the elapse of the time. The laser irradiation target referred to here is an object which the laser hits. The rear side of the vehicle 900 referred to here is a side opposite to side toward the running direction of the vehicle 900. Therefore, as illustrated in the example of FIG. 7, a slope is generated in the line. As the speed of the vehicle 900 becomes faster, the slope of the line increases.

From this slope, it is possible to obtain the relative speed of the laser irradiation target with respect to the position estimation laser sensor 130. When irradiating a stationary object like the insulator 850 with the laser, the relative speed indicates the speed of the vehicle 900.

Specifically, as indicated by points P11 and P12 in FIG. 7, at the respective timings when the laser is irradiated to the same object in the directly forward direction of the vehicle 900 and the rearmost direction of the vehicle 900, the distance measured by the position estimation laser sensor 130 is acquired. An example of laser irradiation in the foremost direction of the vehicle 900 is illustrated at a point P11. An example of laser irradiation in the rearmost direction of the vehicle 900 is illustrated at a point P12.

Figure 8:
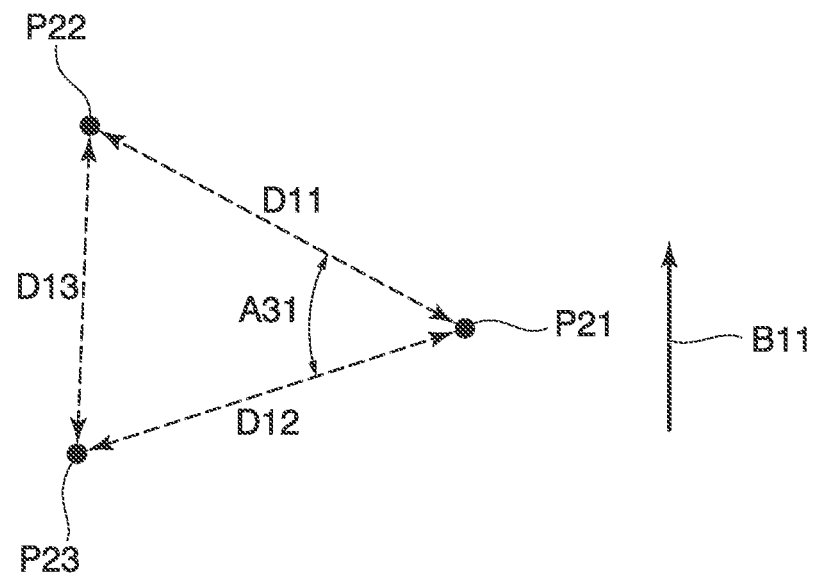
FIG. 8 is an explanatory view illustrating an example of a positional relationship between the position estimation laser sensor and a laser irradiation target according to the embodiment of the present invention.

FIG. 8 is an explanatory view illustrating an example of the positional relationship between the position estimation laser sensor 130 and the laser irradiation target.

A point P21 of FIG. 8 indicates the position of the position estimation laser sensor 130. A point P22 indicates the direction of the laser irradiation target when the laser irradiation target is irradiated with the laser in the foremost direction of the vehicle 900. As described above, an example of irradiation of the laser in the foremost direction of the vehicle 900 is indicated by a point P11. A point P23 indicates the direction of the laser irradiation target when the laser irradiation target is irradiated with the laser in the rearmost direction of the vehicle 900. As described above, an example of the irradiation of the laser in the rearmost direction of the vehicle 900 is illustrated by a point P12. An arrow B11 indicates the running direction of the vehicle 900.

A distance D11 between the point P21 and the point P22 and a distance D12 between the point P21 and the point P23 are both measured by the position estimation laser sensor 130. An angle A31 at which the position estimation laser sensor 130 changes the direction of the laser is known. From these distances D11, D12 and the angle A31, a distance D13 between the point P22 and the point P23 can be obtained. By dividing this distance D13 by the time T11 (see FIG. 7) from when the irradiation target is located at the point P22 to when the irradiation target is located at the point P23, the position of the irradiation target with respect to the position estimation laser sensor 130 is obtained. By irradiating the stationary object like the insulator 850 with the laser, this relative speed indicates the speed of the vehicle 900.

In this manner, the position estimation unit 292 obtains the running speed of the vehicle 900 and integrates the obtained running speed, thereby obtaining the position of the vehicle 900 in kilometers.

As described above, the position estimation unit 292 can obtain the speed of the vehicle 900, without the need for connecting the wiring to an existing device in the vehicle 900, by obtaining the speed of the vehicle 900 on the basis of the measurement results of the distance obtained by the position estimation laser sensor 130. For example, when installing the wear degree information acquiring device 10 in the existing vehicle 900 afterwards, it is not necessary for the wear degree information acquiring device 10 to perform the wiring for acquiring the speed information from the existing device. In this respect, the installation work of the wear degree information acquiring device 10 is simplified. In particular, when installing the wear degree information acquiring device 10, it is possible to minimize problems in understanding the existing wiring of the vehicle 900, and it is possible to reduce the likelihood of occurrence of a problem due to a wiring error.

The timing detection unit 140 outputs a sampling timing signal each time the vehicle 900 runs at a constant interval. The timing detection unit 140 detects the sampling timing, for example, on the basis of the rotation of the motor coupling hub of the running motor of the vehicle 900.

Figure 9:
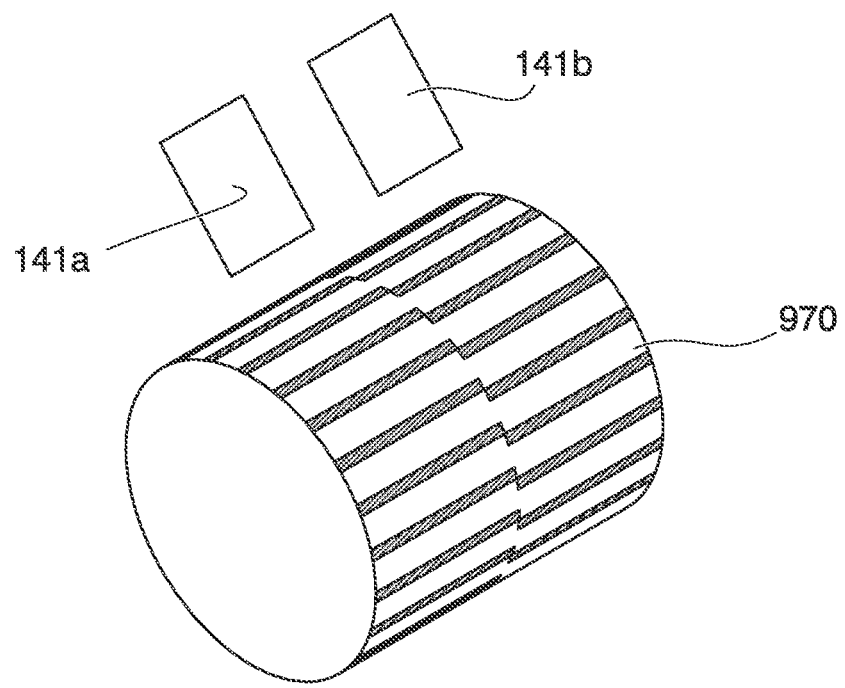
FIG. 9 is an explanatory view illustrating an example of a method of detecting rotation of a motor coupling hub according to the embodiment of the present invention.

FIG. 9 is an explanatory view illustrating an example of a method of detecting the rotation of the motor coupling hub. In the example of FIG. 9, a linear mark is attached to the outer periphery of the motor coupling hub 970 at constant intervals. The timing detection unit 140 includes a fiber sensor 141a and detects a mark, thereby detecting that the motor coupling hub 970 has rotated by a predetermined angle. As a result, the timing detection unit 140 detects that the vehicle 900 runs at a constant interval and outputs a sampling timing signal.

Each time the timing detection unit 140 outputs the sampling timing signal, the upper laser sensor 121 and the lower laser sensor 122 output the laser to measure the distance. Further, the wear degree information acquiring unit 291 determines the degree of wear of the power cable 840 on the basis of the distance measurement result.

As described above, the wear degree information acquiring unit 291 acquires information that indicates the degree of wear of the power cable 840 each time the timing detection unit 140 outputs the sampling timing signal. As a result, the wear degree information acquiring unit 291 can determine the degree of wear of the power cable 840 at the same interval in the running direction of the vehicle 900, independently of the speed of the vehicle 900. Therefore, even when the vehicle 900 is running at a high speed, it is possible to avoid a problem in which the sampling interval becomes too wide and the accuracy of determination of the degree of wear of the power cable 840 deteriorates. Further, even when the vehicle 900 is running at a low speed, it is possible to avoid a problem in which the sampling frequency per length of the power cable 840 increases and the data amount becomes enormous.

The fiber sensor 141b is provided to detect the rotational direction of the motor coupling hub 970. The motor coupling hub 970 may be further marked in a phase different from that of a mark detected by the fiber sensor 141a, and the fiber sensor 141b may detect this mark. As an example of a phase different from that of the mark detected by the fiber sensor 141a, there is an example in which the phase is shifted by 90 degrees.

When the rotational direction of the motor coupling hub 970 is reversed, the relationship between the time from when the fiber sensor 141a detects the mark until the fiber sensor 141b detects the mark, and the time from when the fiber sensor 141b detects the mark until the fiber sensor 141a detects the mark is also reversed. Therefore, the timing detection unit 140 can detect the rotational direction of the motor coupling hub 970, by comparing the time from when the fiber sensor 141a detects the mark until the fiber sensor 141b detects the mark, and the time from when the fiber sensor 141b detects the mark until the fiber sensor 141a detects the mark.

When it is not necessary to detect the rotational direction of the motor coupling hub 970, the timing detection unit 140 may not include the fiber sensor 141b.

The timing detection unit 140 may output the sampling timing signal at a timing other than each time the vehicle 900 runs at a constant interval, such as outputting a sampling timing signal at regular time intervals. For example, when outputting the sampling timing signal at regular time intervals, the timing detection unit 140 may include a timer to measure the elapse of a certain time. In this respect, the configuration of the timing detection unit 140 can be simplified.

The wear degree information acquiring unit 291 may set the sampling period depending on the speed of the vehicle 900. For example, the wear degree information acquiring unit 291 may acquire the speed of the vehicle 900 calculated by the position estimation unit 292, and may set the sampling period depending on the acquired speed. The wear degree information acquiring unit 291 sets the sampling period to be shorter as the speed of the vehicle 900 increases.

In this way, when the wear degree information acquiring unit 291 sets the sampling period depending on the speed of the vehicle 900, the timing detection unit 140 becomes unnecessary. That is, there is no need for the wear degree information acquiring device 10 to include the timing detection unit 140, and in this respect, it is possible to simplify the configuration of the wear degree information acquiring device 10.

The wear degree information acquiring device main body 200 determines the wear degree of the power cable 840, on the basis of the distance measured by the power cable measuring unit 110 using the upper laser sensor 121 and the lower laser sensor 122. The wear degree information acquiring device main body 200 is configured using, for example, a computer.

The communication unit 210 communicates with the power cable measuring unit 110, the position estimation laser sensor 130, and the timing detection unit 140. The communication unit 210 acquires the measurement value of the distance from the power cable measuring unit 110 and the position estimation laser sensor 130. Further, the communication unit 210 acquires the sampling timing signal which is output from the timing detection unit 140. The communication unit 210 is configured, using, for example, a communication circuit provided in the wear degree information acquiring device main body 200.

The display unit 230 has, for example, a display screen such as a liquid crystal panel or an LED (Light Emitting Diode) panel, and displays various images. In particular, the display unit 230 displays the determination result of the degree of wear of the power cable 840 obtained by the wear degree information acquiring unit 291.

The manipulation input unit 220 includes an input device such as a touch sensor that is provided on the display screen of the display unit 230 and constitutes a touch panel, and receives a user manipulation.

The storage unit 280 stores various kinds of information. The storage unit 280 is configured using, for example, a storage device provided in the wear degree information acquiring device main body 200.

The control unit 290 controls each unit of the wear degree information acquiring device 10 to execute various processes.

The control unit 290 is configured, for example, so that a CPU (Central Processing Unit) included in the wear degree information acquiring device main body 200 reads and executes a program from the storage unit 280.

The wear degree information acquiring unit 291 acquires information indicating the degree of wear of the power cable 840, on the basis of a difference between the distance from the predetermined position of the vehicle 900 to the wearing part of the power cable 840 and the distance from the predetermined position of the vehicle 900 to the non-wearing part.

Figure 10:
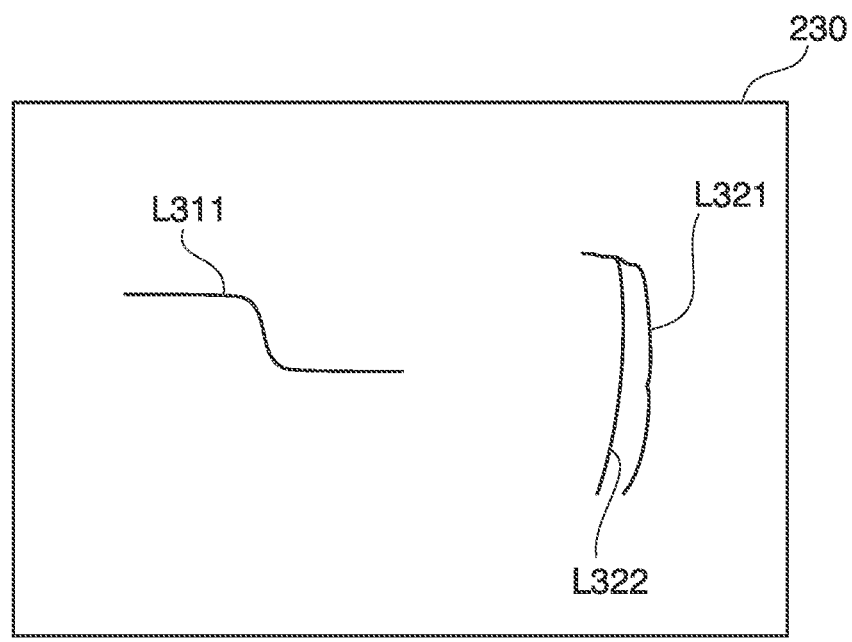
FIG. 10 is an explanatory view illustrating an example of a display screen illustrating a positional relationship between a wearing part and a non-wearing part according to the embodiment of the present invention.

FIG. 10 is an explanatory view illustrating an example of a display screen illustrating the positional relationship between the wearing part and the non-wearing part. Hereinafter, information obtained by scanning the power cable 840 with the upper laser sensor 121 will be described as an example. Similarly, from the information obtained by scanning the power cable 840 with the lower laser sensor 122, the degree of wear of the power cable 840 can be determined.

A line L311 of FIG. 10 illustrates a shape obtained by scanning the non-wearing part of the power cable 840 with the upper laser sensor 121. A line L321 illustrates a shape obtained by scanning the wearing part with the upper laser sensor 121 in a state in which the power cable 840 is not worn. A line L322 illustrates a shape obtained by scanning the wearing part with the upper laser sensor 121 when the power cable 840 is worn.

The storage unit 280 previously stores the shapes of the non-wearing part and the wearing part in a state in which the power cable 840 is not worn as in the line L311 and the line L321, including the positional relationship between the non-wearing part and the wearing part.

Further, when the upper laser sensor 121 scans the power cable 840 to acquire the distance information, the wear degree information acquiring unit 291 converts information in which the direction in which the upper laser sensor 121 radiates the laser is associated with the distance detected by the upper laser sensor 121 into information indicating the shape. As a result, the wear degree information acquiring unit 291 acquires information indicating the shape including the non-wearing part and the wearing part, as in the example of the line L311 and the line L322.

The wear degree information acquiring unit 291 reads information indicating the shape of the non-wearing part and the wearing part in a state in which the power cable 840 is not worn and the positional relationship between the non-wearing part and the wearing part from the storage unit 280, and superimposes the shape of the power cable 840 obtained by the scanning of the upper laser sensor 121 and the shape in a state in which the power cable 840 stored in the storage unit 280 is not worn.

Specifically, as illustrated in the example of FIG. 10, the wear degree information acquiring unit 291 superimposes the non-wearing parts of the shape of the power cable 840 obtained by the scanning of the upper laser sensor 121 and the shape in the state in which the power cable 840 stored in the storage unit 280 is not worn. As a result, the degree of wear of the power cable 840 is known. In the example of FIG. 10, a portion between the line L321 and the line L322 corresponds to a portion in which the power cable 840 is worn.

Information indicating the shape of the power cable 840 illustrated in FIG. 10 corresponds to an example of information indicating the degree of wear of the power cable 840.

The wear degree information acquiring unit 291 calculates the distance between the wearing parts of both in the state of superimposing the shape of the power cable 840 obtained by the scanning of the upper laser sensor 121 and the shape of the power cable 840 in a state in which the power cable 840 is not worn by the non-wearing part as described above.

For example, one or more sampling points are predetermined for the shape of the wearing part in a state in which the power cable 840 exemplified by the line L321 is not worn. Further, the wear degree information acquiring unit 291 obtains the distance between the wearing part in the shape of the power cable 840 obtained by scanning by the upper laser sensor 121 and the sampling point for each sampling point. The wear degree information acquiring unit 291 calculates the average of the obtained distances. The wear degree information acquiring unit 291 compares the obtained average value with a predetermined threshold value, and displays a message prompting maintenance of the power cable 840 together with information indicating the corresponding position on the display unit 230, when the obtained average value is larger than the threshold value.

The wear degree information acquiring unit 291 may detect the location at which the distance between the wearing part in a state in which the power cable 840 is not worn and the wearing part in the shape of the power cable 840 obtained by scanning with the upper laser sensor 121 is the largest. The wear degree information acquiring unit 291 compares the distance between the wearing part in a state in which the power cable 840 at the detected location is not worn and the wearing part in the shape of the power cable 840 obtained by scanning with the upper laser sensor 121 with a predetermined threshold value. When the obtained distance is larger than the threshold value, a message prompting maintenance of the power cable 840 is displayed on the display unit 230 together with information indicating the corresponding position.

In this way, since the wear degree information acquiring unit 291 detects a place of the greatest distance between the wearing part in a state in which the power cable 840 is not worn and the wearing part in the shape of the power cable 840 obtained by the scanning of the upper laser sensor 121, there is a high possibility that local wear can be detected.

A difference between a distance from a predetermined position of the vehicle 900 to the wearing part of the power cable 840 and the distance from the predetermined position of the vehicle 900 to the non-wearing part, which is used for obtaining the information indicating the degree of wear of the power cable 840 by the wear degree information acquiring unit 291, is not limited to the difference between these distances.

For example, the wear degree information acquiring unit 291 may calculate a ratio obtained by multiplying the distance between the non-wearing part and the wearing part in the shape of the power cable 840, which is obtained by scanning of the lower laser sensor 122, by the distance between the non-wearing part and the wearing part in a state in which the power cable 840 is not worn. Further, when the calculated ratio is smaller than the predetermined threshold value, the wear degree information acquiring unit 291 may cause the display unit 230 to display a message prompting maintenance of the power cable 840, together with information indicating the corresponding position.

The user may determine the degree of wear of the power cable 840. For example, as illustrated in FIG. 10, the display unit 230 may superimpose the shape of the power cable 840 obtained by scanning of the upper laser sensor 121 and the shape in a state in which the power cable 840 is not worn.

Further, the user may determine whether maintenance of the power cable 840 is necessary on the basis of the obtained display, and may input the determination result to the wear degree information acquiring device 10, using the manipulation input unit 220.

Since the display unit 230 superimposes and displays the shape of the power cable 840 obtained by scanning of the upper laser sensor 121 and the shape in the state in which the power cable 840 is not worn as in the example of FIG. 10, the user can visually grasp the degree of wear of the power cable 840.

However, it is not indispensable for the display unit 230 to display the positional relationship between the wearing part and the non-wearing part. For example, the display unit 230 may display only information indicating the position at which the wear degree information acquiring unit 291 detects the wear of the power cable 840.

The position estimation unit 292 estimates the position of the vehicle 900. Specifically, as described with reference to FIG. 7, the position estimation unit 292 calculates the position of the vehicle 900 at the kilometer, on the basis of the measurement result of the distance by the position estimation laser sensor 130.

When detecting the wear of the power cable 840, the wear degree information acquiring unit 291 displays the information indicating the detection result and the kilometer calculated by the position estimation unit 292 in association with each other on the display unit 230, and stores the information in the storage unit 280. Therefore, the user of the wear degree information acquiring device 10 can grasp the position at which maintenance of the power cable 840 is required.

However, the method by which the position estimation unit 292 acquires the position information of the vehicle 900 is not limited to the method which uses the distance measurement result obtained by the position estimation laser sensor 130. The method by which the position estimation unit 292 acquires the information of the vehicle 900 may be any method capable of acquiring information capable of specifying a wearing part when the wear degree information acquiring unit 291 detects the wear of the power cable 840. For example, when the vehicle 900 acquires the position information of the vehicle 900 itself, such as including a GNSS (Global Navigation Satellite System) receiver, the position estimation unit 292 may acquire the position information from the vehicle 900.

The power cable measuring unit 110 may scan the wearing part of the power cable 840 obliquely with respect to the running direction of the vehicle 900. This will be explained with reference to FIGS. 11 and 12.

Figure 11:
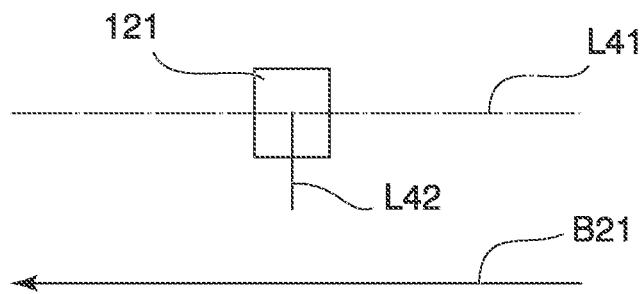
FIG. 11 is an explanatory view illustrating an example in which the power cable measuring unit according to the embodiment of the present invention scans the wearing part of the power cable at approximately right angles with respect to the running direction of the vehicle.

FIG. 11 is an explanatory view illustrating an example in which the power cable measuring unit 110 scans the wearing part of the power cable 840 approximately at right angles to the running direction of the vehicle 900. FIG. 11 illustrates an example in which the upper laser sensor 121 is viewed from just beside the upper laser sensor 121. In particular, FIG. 11 illustrates an example of a case in which the upper laser sensor 121 is viewed from a direction perpendicular to the running direction of the vehicle 900.

A line L41 of FIG. 11 indicates a rotation center at which the upper laser sensor 121 changes the direction of the laser, and a line L42 illustrates an example of a laser trajectory. The running direction of the vehicle 900 is indicated by an arrow B21.

The upper laser sensor 121 changes the direction of the laser in a direction perpendicular to the rotation center.

In the example of FIG. 11, the rotation center is set in the running direction of the vehicle 900, and the upper laser sensor 121 changes the direction of the laser at right angles to the running direction of the vehicle 900. In FIG. 11, the rotation center is indicated by a line L41. As a result, the upper laser sensor 121 scans the wearing part of the power cable 840 approximately at right angles to the running direction of the vehicle 900.

Figure 12:
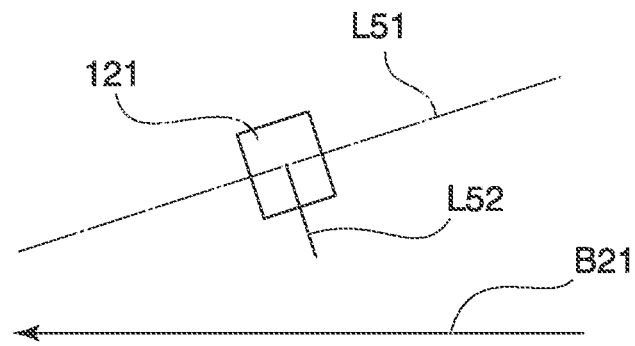
FIG. 12 is an explanatory view illustrating an example in which the power cable measuring unit according to the embodiment of the present invention scans the wearing part of the power cable obliquely with respect to the running direction of the vehicle.

FIG. 12 is an explanatory view illustrating an example in which the power cable measuring unit 110 scans the wearing part of the power cable 840 obliquely with respect to the running direction of the vehicle 900. FIG. 12 illustrates an example of a case in which the upper laser sensor 121 is viewed from just beside the upper laser sensor 121. In particular, FIG. 12 illustrates an example of a case when the upper laser sensor 121 is viewed from a direction perpendicular to the running direction of the vehicle 900.

A line L51 of FIG. 12 indicates a rotation center at which the upper laser sensor 121 changes the direction of the laser, and a line L52 illustrates an example of the laser trajectory. Also, the running direction of the vehicle 900 is indicated by an arrow B21 as in the case of FIG. 11.

Unlike the case of FIG. 11, in the example of FIG. 12, the rotation center is set obliquely with respect to the running direction of the vehicle 900, and the upper laser sensor 121 changes the direction of the laser obliquely with respect to the running direction of the vehicle 900. In FIG. 12, the rotation center is indicated by a line L51. As a result, the upper laser sensor 121 scans the wearing part of the power cable 840 obliquely with respect to the running direction of the vehicle 900. The upper laser sensor 121 measures the distance from the position of the upper laser sensor 121 itself to each scanned position. Further, the wear degree information acquiring unit 291 acquires information indicating the degree of wear at each scanned position by the power cable measuring unit 110 in the wearing part of the power cable 840.

Therefore, it is possible to increase the possibility that the wear degree information acquiring unit 291 can detect the local wear which occurs vertically in the wearing part of the power cable 840.

Specifically, the wear degree information acquiring unit 291 performs scanning obliquely with respect to the local wear which occurs vertically in the wearing part of the power cable 840. Therefore, there is a high possibility that the wearing part and the scanning line intersect at at least one location, as compared to a case where the wear degree information acquiring unit 291 performs the scanning in parallel with the direction of the wearing part.

In the above description, the case of the upper laser sensor 121 has been described as an example, but the same also applies to the lower laser sensor 122.

Next, the operation of the wear degree information acquiring device 10 will be described with reference to FIG. 13.

Figure 13:
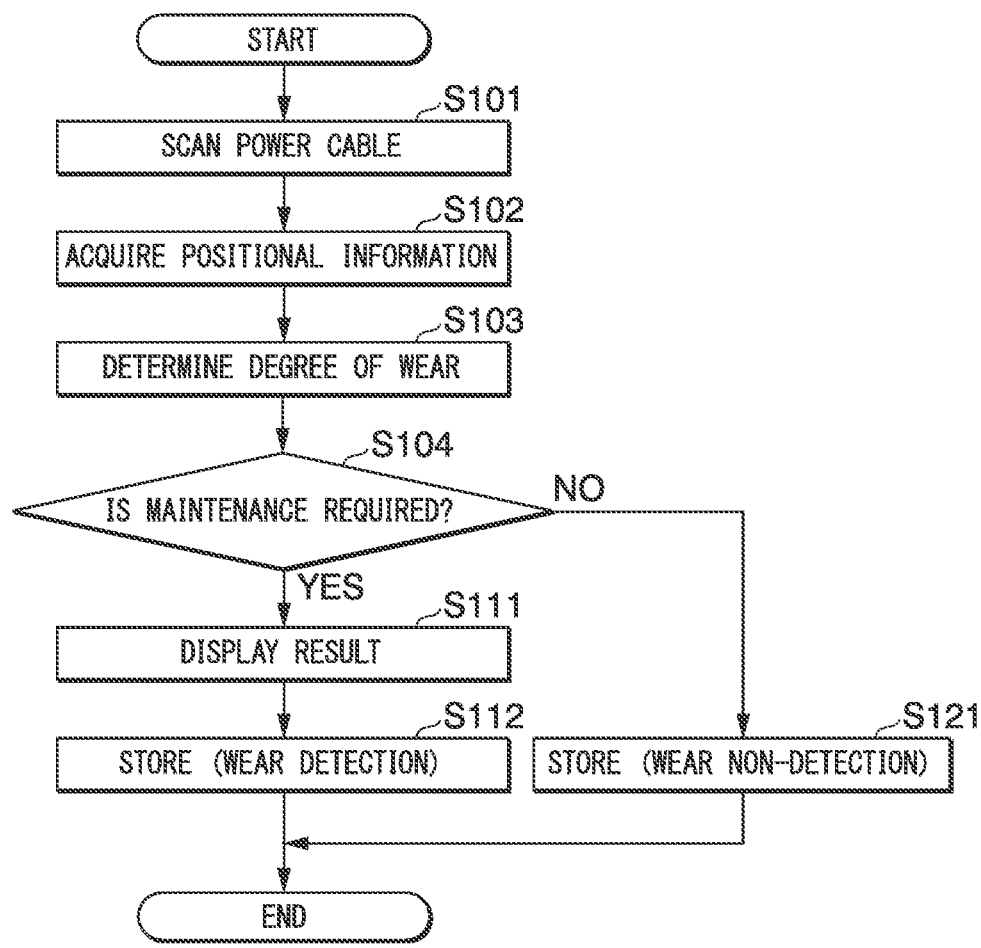
FIG. 13 is a flowchart illustrating an example of a processing procedure for determining the degree of wear of the power cable by the wear degree information acquiring device according to the embodiment of the present invention.

FIG. 13 is a flowchart illustrating an example of a processing procedure by which the wear degree information acquiring device 10 determines the wear degree of the power cable. Each time the timing detection unit 140 detects the sampling timing, the wear degree information acquiring device 10 performs the process of FIG. 13.

In the process of FIG. 13, the power cable measuring unit 110 measures the distance from the position of the power cable measuring unit 110 to the position irradiated with the laser by scanning the power cable with the laser (step S101). As an example of the position of the power cable measuring unit 110, there is a position of the upper laser sensor 121 or a position of the lower laser sensor 122.

Next, the position estimation unit 292 estimates the position of the vehicle 900 (step S102). For example, as described with reference to FIGS. 7 and 8, the position estimation unit 292 calculates the position of the vehicle 900 at the kilometer, on the basis of the measurement result of the distance obtained by the position estimation laser sensor 130.

Further, the wear degree information acquiring unit 291 determines the degree of wear of the power cable 840 on the basis of the distance measured by the power cable measuring unit 110 (step S103). For example, the wear degree information acquiring unit 291 calculates the distance between the wearing part in the shape of the power cable 840 in a state in which the power cable 840 is not worn and the wearing part in the shape of the power cable 840 obtained by scanning the power cable measuring unit 110. Further, the wear degree information acquiring unit 291 compares the calculated distance with a predetermined threshold value.

Further, the wear degree information acquiring unit 291 determines whether or not maintenance is necessary depending on the determination result of the degree of wear at step S103 (step S104). Specifically, when the distance calculated in step S103 is determined to be larger than the threshold value, the wear degree information acquiring unit 291 determines that maintenance is necessary. On the other hand, when the distance calculated in step S103 is determined to be equal to or smaller than the threshold value, the wear degree information acquiring unit 291 determines that maintenance is unnecessary.

When it is determined that maintenance is necessary (step S104: YES), the wear degree information acquiring unit 291 causes the display unit 230 to display the determination result. For example, the wear degree information acquiring unit 291 causes the display unit 230 to display a message prompting maintenance, information indicating a position determined that the maintenance is necessary, and the shape of the power cable 840 as in the example of FIG. 10 (step S111). The position information obtained in step S102 is used as information indicating the position determined that the maintenance is necessary.

Further, the wear degree information acquiring unit 291 causes the storage unit 280 to store a detection result indicating that the wear is detected (step S112). For example, the wear degree information acquiring unit 291 causes the storage unit 280 to store information obtained by combining a detection result indicating that wear is detected, information indicating a position at which the wear is detected, and information indicating the shape of the power cable 840 as in the example of FIG. 10. The position information obtained in step S102 is used as the information indicating the position where wear is detected.

After step S112, the process of FIG. 13 ends.

On the other hand, when it is determined that maintenance is unnecessary in step S104 (step S104: NO), the wear degree information acquiring unit 291 causes the storage unit 280 to store the detection result indicating that wear is not detected (step S121). For example, the wear degree information acquiring unit 291 causes the storage unit 280 to store information obtained by combining a detection result indicating that wear is not detected, information indicating a position at which the wear is detected, and information indicating the shape of the power cable 840 as in the example of FIG. 10. The position information obtained in step S102 is used as the information indicating the position at which the wear is detected.

After step S121, the process of FIG. 13 ends.

The wear degree information acquiring device main body 200 may be configured not to be mounted on the vehicle 900. For example, the wear degree information acquiring device main body 200 may be installed in the office, and the degree of wear of the electric wire may be determined by acquiring the information obtained by running of the vehicle 900 afterward.

Part of the function of the wear degree information acquiring device 10 may be executed by another device. For example, the position estimation function of the vehicle 900 by the position estimation unit 292 may be performed by a computer provided on the ground side such as a vehicle base. For example, the wear degree acquiring device 10 may transmit the acquired data to a computer on the ground side, and the computer may estimate the position of the vehicle 900 on the basis of the received data.

Further, a display device provided on the ground side such as a vehicle base may perform all or a part of various images such as wear degree and message displayed by the display unit 230. For example, the wear degree acquiring device 10 or a computer that has received data from the wear degree acquiring device 10 may transmit data such as a wear degree determination result and a message to the display device on the ground side, and the display device may display an image such as a wear degree determination result and a message, on the basis of the received data.

As described above, the power cable measuring unit 110 measures the distance from the predetermined position of the vehicle 900 for each of the wearing parts that comes into contact with the vehicle 900 and the non-wearing part that does not come into contact with the vehicle 900 among the power cables 840 that supply power to the vehicle 900. As an example of a predetermined position of the vehicle 900, a position of the upper laser sensor 121 or a position of the lower laser sensor 122 may be adopted. The wear degree information acquiring unit 291 acquires information indicating the degree of wear of the power cable 840 on the basis of a difference between the distance from the predetermined position of the vehicle 900 to the wearing part and the distance from the predetermined position of the vehicle 900 to the non-wearing part.

As a result, the wear degree information acquiring device 10 can detect the wear of the power cable 840 even when the width of the wearing part is kept substantially constant even if the power cable 840 is worn. For example, in the power cable 840 illustrated in FIG. 4, the width of the wearing part is kept substantially constant even if the wearing part is worn. The wearing part referred to here is a part in which the power cable 840 comes into contact with the rubbing plate 951 as indicated by the region A11. Even in such a case, as described above, the wear degree information acquiring device 10 can detect the wear of the power cable 840.

Further, if the vehicle 900 runs once on the trajectory 800, it is possible to determine the degree of wear of the power cable 840 for all sections running on the trajectory 800. Conventionally, a maintenance person enters into the trajectory and determines the degree of wear of the power cable by visual inspection or the like, whereas the wear degree information acquiring device 10 can reduce the burden on the maintenance person.

Further, the timing detection unit 140 outputs a sampling timing signal each time the vehicle 900 runs at a constant interval. The wear degree information acquiring unit 291 acquires information indicating the degree of wear of the power cable 840 each time the timing detection unit 140 outputs the sampling timing signal.

As a result, the wear degree information acquiring unit 291 can determine the degree of wear of the power cable 840 at the same interval in the running direction of the vehicle 900, without depending on the speed of the vehicle 900. Therefore, even when the vehicle 900 is running at a high speed, it is possible to prevent the sampling interval from becoming too wide and the accuracy of determination of the degree of wear of the power cable 840 from deteriorating. Further, even when the vehicle 900 is running at a low speed, it is possible to prevent the number of times of sampling per length of the power cable 840 from increasing and the data amount from becoming enormous.

Further, the power cable measuring unit 110 scans the wearing part obliquely with respect to the running direction of the vehicle 900, and measures the distance from the predetermined position of the vehicle 900 to each scanned position. As an example of a predetermined position of the vehicle 900, a position of the upper laser sensor 121 or a position of the lower laser sensor 122 is adopted. Further, the wear degree information acquiring unit 291 acquires information indicating the degree of wear at each scanned position by the power cable measuring unit 110 among the wearing parts.

Therefore, it is possible to increase the possibility that the wear degree information acquiring unit 291 can detect the local wear which occurs vertically in the wearing part of the power cable 840.

Further, processing of each part may be performed, by recording a program for achieving all or part of the functions of the control unit 290 on a computer-readable recording medium, and by causing the computer system to read a program recorded on the recording medium. Further, the "computer system" referred to here includes hardware such as an OS or peripheral devices.

Further, "computer-readable recording medium" refers to a portable medium such as such as a flexible disk, a magneto-optical disk, a ROM and a CD-ROM, and a storage device such as a hard disk built in a computer system. Further, the above-described program may be one for achieving a part of the above-described functions, or may be one which can achieve the above-described function in combination with a program already recorded in the computer system.

Although the embodiments of the present invention have been described above in detail with reference to the drawings, specific configurations are not limited to this embodiment, and design changes and the like within the scope not departing from the gist of the present invention are also included.

INDUSTRIAL APPLICABILITY

An embodiment of the present invention relates to a wear degree information acquiring device which includes a power cable measuring unit which measures a distance from a predetermined position of a vehicle for each of a wearing part coming into contact with the vehicle and a non-wearing part not coming into contact with the vehicle, among power cables configured to supply power to the vehicle; and a wear degree information acquiring unit which acquires information indicating a degree of wear of the power cable, on the basis of a difference between a distance from a predetermined position of the vehicle to the wearing part and the distance from the predetermined position of the vehicle to the non-wearing part.

According to this embodiment, even when the width of the wearing part is kept substantially constant even if the power cable is worn, the wear of the power cable can be detected.

REFERENCE SIGNS LIST

10 Wear degree information acquiring device
110 Power cable measuring unit
121 Upper laser sensor
122 Lower laser sensor
130 Position estimation laser sensor
140 Timing detection unit
200 Wear degree information acquiring device main body
210 Communication unit
220 Manipulation input unit
230 Display unit
280 Storage unit
290 Control unit
291 Wear degree information acquiring unit
292 Position estimation unit
900 Vehicle

The invention claimed is:

1. A wear degree information acquiring device configured to detect a degree of wear of a power cable supplying power by being in contact with a vehicle running on a road, wherein the power cable includes a non-contact part and a contact part supplying power to the vehicle, said wear degree information acquiring device comprising:

a power cable measuring unit including
  an upper laser sensor which is attached to the vehicle in an obliquely-upper direction to the power cable and configured to measure a first distance of the upper laser sensor with the power cable via laser scanning and
  a lower laser sensor which is attached to the vehicle in an obliquely-lower direction to the power cable and configured to measure a second distance of the lower laser sensor with the power cable via laser scanning; and
a wear degree information acquiring unit in which upon measuring a first shape of the contact part of the power cable in advance, a second shape of the contact part of the power cable being worn in contact with the vehicle is detected based on the first distance of the upper laser sensor and the second distance of the lower laser sensor, thus acquiring information indicating the degree of wear of the power cable according to a difference between the first shape and the second shape.

2. The wear degree information acquiring device according to claim 1, further comprising:
  a timing detection unit which outputs a sampling timing signal each time the vehicle runs at a constant interval,
  wherein the wear degree information acquiring unit acquires information indicating the degree of wear of the power cable, each time the timing detection unit outputs the sampling timing signal.

3. The wear degree information acquiring device according to claim 1, wherein the power cable measuring unit scans a plurality of positions of the wearing part obliquely with respect to a running direction of the vehicle to measure a distance from the predetermined position of the vehicle to each of the plurality of scanned positions, and
  the wear degree information acquiring unit acquires information indicating the degree of wear at each scanned position by the power cable measuring unit in the wearing part.

4. The wear degree information acquiring device according to claim 1, wherein the power cable measuring unit is disposed oppositely to the power cable in view of the vehicle such that the upper laser sensor and the lower laser sensor are disposed at different heights and different positions with respect to the vehicle.

5. A method of acquiring wear degree information by detecting a degree of wear of a power cable supplying power by being in contact with a vehicle running on a road, wherein the power cable includes a non-contact part and a contact part supplying power to the vehicle, the method comprising:
  measuring a first distance with the power cable via laser scanning in an obliquely-upper direction;
  measuring a second distance with the power cable via laser scanning in an obliquely-lower direction;
  upon measuring a first shape of the contact part of the power cable in advance, detecting a second shape of the contact part of the power cable being worn in contact with the vehicle based on the first distance and the second distance; and
  acquiring information indicating the degree of wear of the power cable according to a difference between the first shape and the second shape.

6. A non-transitory computer-readable recording medium storing a program for acquiring wear degree information by detecting a degree of wear of a power cable supplying power by being in contact with a vehicle running on a road, wherein the power cable includes a non-contact part and a contact part supplying power to the vehicle, the program causing, when executed by a processor, the processor to execute:
  measuring a first distance with the power cable via laser scanning in an obliquely-upper direction;
  measuring a second distance with the power cable via laser scanning in an obliquely-lower direction;
  upon measuring a first shape of the contact part of the power cable in advance, detecting a second shape of the contact part of the power cable being worn in contact with the vehicle based on the first distance and the second distance; and
  acquiring information indicating the degree of wear of the power cable according to a difference between the first shape and the second shape.

* * * * *